United States Patent Office 3,179,643
Patented Apr. 20, 1965

3,179,643
1,2,3,5,6-PENTANITROMANNITE 4-ACRYLATE POLYMER, METHOD OF MAKING, AND EXPLOSIVE COMPOSITIONS COMPOUNDED THEREWITH
Joseph William Lawrence, Tamaqua, Pa., assignor to Atlas Chemical Industries, Inc., Wilmington, Del., a corporation of Delaware
No Drawing. Filed Dec. 15, 1961, Ser. No. 159,732
4 Claims. (Cl. 260—89.5)

The present invention relates to a polymerized 1,2,3,5,6-pentanitromannite 4-acrylate (PNM 4-acrylate), a method of preparing such polymer, and to explosive compositions compounded with the polymer. More particularly, the present invention relates to a solid PNM 4-acrylate polymer, a method of making a solid PNM 4-acrylate polymer, and to the use of the polymer in the manufacture of explosives.

In accordance with the present invention, a polymerized 1,2,3,5,6-pentanitromannite 4-acrylate having the following probable formula is produced:

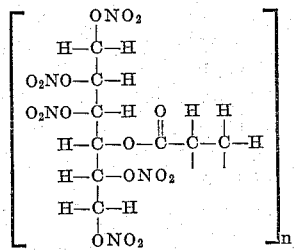

The present invention also includes a method of preparing a solid PNM 4-acrylate polymer. The solid PNM 4-acrylate product of the present invention may be produced by reacting a 1,2,3,5,6-pentanitromannite starting material with acrylyl chloride. Preferably this reaction is carried out at a temperature between about 60° C. and about 100° C. over a period of at least 1 hour to form a PNM 4-acrylate reaction product. Preferably an excess of acrylyl chloride over the mol reaction requirement is utilized. Reaction periods longer than 2 hours generally do not significantly increase the yield of PNM 4-acrylate reaction product. The reaction product is then vacuum stripped to remove any excess acrylyl chloride and the stripped product warmed in an inert solvent in the presence of a free radical polymerization catalyst to produce a solid polymerized PNM 4-acrylate product. The term "inert solvent" is meant to include solvents of the PNM 4-acrylate reaction product which do not react with the PNM 4-acrylate reaction product or with acrylyl chloride. Suitable inert solvents are, for example: benzene, xylene, toluene and chlorinated benzenes. Benzene, because of its availability and low cost, has been found to be particularly suited to use as an inert solvent. The term "free radical polymerization catalyst" is meant to include free radical catalysts commonly used to catalyze polymerization reactions, for example, benzoyl peroxide, sodium persulfate, and tert butylhydroperoxide. Benzoyl peroxide is commonly available and has been found to be particularly suited to use as a free radical polymerization catalyst.

The PNM 4-acrylate polymer produced by the present invention is a brittle glass-like substance at temperatures up to about 30° C. at which point the material begins to soften. As the temperature is slowly raised to about 100° C. the material slowly decomposes with the evolution of a gas until it is substantially completely decomposed at a temperature of about 300° C. When heated through this range the polymer changes from a clear, glass-like material to a clear liquid which reddens and then darkens and lastily changes to a char. The polymer is substantially insoluble in methanol, chloroform or benzene, but is soluble in acetone.

A PNM 4-acrylate product and an attempt to polymerize the product is described by Wolfrom et al., volume 81, Journal of the American Chemical Society (1959), page 5701. The product and method of the present invention differ from the product and method described by Wolfrom et al., in that the present product is a brittle solid at temperatures up to 30° C., the present method does not involve a use of solvents in the preparation of the acrylate, and the present polymerization process is carried out at 60° C. to 80° C. over a time period of less than 2 hours, whereas the Wolfrom article describes a material obtained at 0° C. over a time period of 24 hours.

The polymerized 1,2,3,5,6-pentanitromannite 4-acrylate product of the present invention is readily deflagrated when rapidly heated to a temperature of about 300° C. The polymer is aptly suited to be cast and is suited to use as a matrix or binder material for other fuels or explosive materials to form shaped blocks. Examples of suitable ingredients which may be included in the polymer binder to produce an explosive material suited to casting include ammonium nitrate, pentaerythritol tetranitrate (PETN), cyclo trimethylenetrinitramine (cyclonite), and trinitrotoluene (TNT). The polymer of the present invention is also suited to use as a coating on particulate materials to produce polymer coated particles. The polymer of the present invention is particularly suited to use as a sensitizing and waterproofing coating for particulate ammonium nitrate.

A block-type explosive material, may be prepared by warming the polymer until it is fluid, about 35–40° C., combining a suitable particulate ingredient with the melt stirring and allowing the mixture to cool. The result is a solid block of explosive material containing the particulate ingredient in a binder of PNM 4-acrylate. If desired the explosive mixture with the polymer in a melted condition may be cast into a shape or form and allowed to cool and solidify in such shape.

An explosive material in particulate form may be prepared by warming the polymer until it is fluid, combining the fluid polymer with a suitable amount of a particulate explosive ingredient. The mixture is then agitated to coat the particles with a polymer coating and the coating allowed to cool and solidify on the particles. The latter cooling step is preferably carried out by spreading the agitated mixture of melted polymer and particulate material in a thin layer and allowing the polymer to solidify.

The following examples illustrate the present invention: Example 1 shows a method of preparing PNM 4-acrylate; Example 2 shows a method of preparing a solid PNM 4-acrylate polymer, and; Example 3 shows a method of producing a sensitized, coated ammonium nitrate explosive.

EXAMPLE 1

*Preparation of 1,2,3,5,6-pentanitromannite 4-acrylate*

100 parts by weight of 1,2,3,5,6-pentanitromannite were mixed with 143 parts by weight of acrylyl chloride, containing about 1.5 parts by weight of hydroquinone. The small amount of hydroquinone was added to the acrylyl chloride component to insure that the acrylyl chloride did not polymerize by itself and thereby become unavailable to react with the 1,2,3,5,6-PNM. The mixture was warmed in a water bath at 70° C. to 80° C. for about one and one-half hours. The excess acrylyl chloride and formed hydrogen chloride were removed by distilling the mixture under a pressure of 30 mm. of mercury at 60° C. The product was a slightly amber colored syrup. The syrup product was then dissolved in ethyl acetate and extracted with sodium carbonate. An emulsion formed which was broken by adding a saturated sodium chloride solution. The ethyl acetate phase was then separated and washed first with a saturated sodium chloride solution and then with water. The ethyl acetate phase was then dried over sodium sulfate, filtered through active carbon and diatomaceous earth to yield a clear solution. The clear solution was then vacuum distilled to dryness at a pressure of 30 mm. of mercury at 40–65° C. temperature range. The yield was 84 parts by weight of 1,2,3,5,6-pentanitromannite 4-acrylate, an almost colorless liquid. The identification of the product was confirmed by a UV spectrum and IR spectrum determinations. The UV spectrum showed no adsorption in the 230–320 m$\mu$ range at a concentration of 0.16 mg./ml. ethanol and a 1 cm. cell. The IR spectrum displayed no —OH adsorption and had an ester carbonyl at 5.76$\mu$.

EXAMPLE 2

*Preparation of 1,2,3,5,6-pentanitromannite 4-acrylate polymer*

100 parts by weight of a PNM 4-acrylate product prepared in accord with Example 1 were dissolved in 76 parts by weight of benzene. 0.05 part by weight of benzoyl peroxide were added and the mixture warmed in a flask open to air at a temperature of from 60° C. to 70° C. for one and a half hours. An additional 0.06 part by weight of benzoyl peroxide was added and the mixture warmed for two and one-half hours longer. By the third hour of warming a gummy precipitate commenced to form. A sample of the precipitate removed from the flask thickened to a putty-like mass that readily deflagrated when placed on a heated hot plate. After a total warming period of four hours the benzene was blown off with nitrogen and the reaction flask evacuated for a period of one and a half hours while at a temperature of 70° C. to 80° C. The yield was 97 parts by weight of a viscous syrup. The syrup had a very slight solubility in methanol, chloroform or benzene indicating that a high degree of polymerization had occurred. The syrup product was found to be soluble in acetone. The syrup product was dissolved in acetone and the solvent removed by vacuum distillation. The oily residue from the vacuum distillation was then mixed with chloroform and precipitated a glassy semi-solid. The liquid portion of the mixture was decanted. The solid portion was found to weigh 14.4 parts. The product was found to be stable when held at a temperature of 90° C. for 16 hours with substantially no decomposition. The product was found to remain in a solid state at temperatures of 30° C. and below. Upon slowly heating the product over 30° C., the product softened, then melted and, as the temperature was increased to about 100° C. the material began to slowly decompose until it was substantially completely decomposed when a temperature of 300° C. was reached.

EXAMPLE 3

*Preparation of a 1,2,3,5,6-pentanitromannite 4-acrylate polymer coated ammonium nitrate composition*

Equal weights of particulate ammonium nitrate and PNM 4-acrylate polymer were heated together in a vessel at 110° C. The polymer was fluid at this temperature. The polymer adhered to the particulate ammonium nitrate and when the mixture was agitated a coating formed on the ammonium nitrate particles.

A coated particulate ammonium product was formed by allowing the mixture to cool in a thin layer. The water solubility of the product was compared to an untreated sample of ammonium nitrate, by placing equal samples of coated and uncoated ammonium nitrate in beakers and noting the time required to dissolve the samples. The untreated ammonium nitrate sample was found to dissolve in 30 seconds. The coated sample was found to remain undissolved for 5 minutes.

What is claimed is:

1. A homopolymeric 1,2,3,5,6-pentanitromannite 4-acrylate product solid at temperatures up to 30° C.

2. A method of preparing 1,2,3,5,6-pentanitromannite 4-acrylate polymer which comprises warming 1,2,3,5,6-pentanitromannite 4-acrylate in an inert solvent in the presence of a free radical polymerization catalyst to produce a 1,2,3,5,6-pentanitromannite 4-acrylate polymer product.

3. The method of claim 2 wherein the inert solvent is benzene.

4. The method of claim 2 wherein the free radical polymerization catalyst is benzoyl peroxide.

References Cited by the Examiner

UNITED STATES PATENTS

| | | | |
|---|---|---|---|
| 2,138,031 | 11/38 | Graves | 260—89.5 |
| 2,204,517 | 6/40 | Strain | 260—89.5 |
| 2,361,055 | 10/44 | Pollack | 260—89.5 |
| 2,363,044 | 11/44 | Clifford | 260—89.5 |
| 3,000,714 | 9/61 | Batchelder | 149—19 |
| 3,006,743 | 10/61 | Fox et al. | 149—19 |

OTHER REFERENCES

Wolfrom et al.: JACS, vol. 81 (1959), pages 5701–5.

LEON J. BERCOVITZ, *Primary Examiner.*

L. D. ROSDOL, J. R. LIBERMAN, *Examiners.*